United States Patent

Lorenzetti

[15] 3,670,087

[45] June 13, 1972

[54] METHOD OF LOWERING INTRAOCULAR PRESSURE

[72] Inventor: Olfeo John Lorenzetti, Forth Worth, Tex.

[73] Assignee: Miles Laboratories, Inc., Elkhart, Ind.

[22] Filed: Oct. 16, 1970

[21] Appl. No.: 81,430

[52] U.S. Cl. .............................................................. 424/273
[51] Int. Cl. ........................................................ A61k 27/00
[58] Field of Search .................................................. 424/273

[56] References Cited

OTHER PUBLICATIONS

Chem. Abst., 45 (10402 b), 1951.
Merck Manual, 11th Ed. (1966), pp. 511– 515.
American Drug Index, (1970), pp. 402– 404.

Primary Examiner—Stanley J. Friedman
Attorney—Joseph C. Schwalbach, Louis E. Davidson and Harry T. Stephenson

[57] ABSTRACT

Oxymetazoline and xylometazoline preferably in the form of an aqueous solution of their hydrochlorides are effective in lowering intraocular pressure when applied topically to the eye and are therefore useful in the treatment of glaucoma.

7 Claims, No Drawings

METHOD OF LOWERING INTRAOCULAR PRESSURE

BACKGROUND OF THE INVENTION

Glaucoma is a disease characterized by increased intraocular tension which can cause impairment of vision ranging from slight abnormalities to absolute blindness. The causes of glaucoma are unknown although emotional instability and especially heredity are the predisposing factors. In the past, preparations for treating glaucoma included miotics such as pilocarpine, demecarium, echothiophate, epinephrine bitartrate and carbonic anhydrase inhibitors such as acetazolamide. Although these medicaments are somewhat effective in reducing intraocular pressure, they are not stable, require frequent administration due to low potency and have undesirable side effects.

SUMMARY OF THE INVENTION

It has now been found that certain aralkylimidazolines of the formula

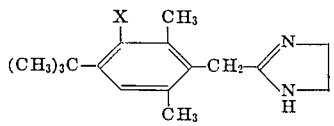

wherein X is hydrogen or hydroxyl are excellent intraocular pressure lowering agents. Where X is hydrogen in the foregoing formula, it represents 2-(4-t-butyl-2,6-dimethylbenzyl)-2-imidazoline commonly known and hereinafter referred to as xylometazoline. Where X is OH in the foregoing formula, the compound is 6-t-butyl-3-(2-imidazolin-2-ylmethyl)-2,4 - dimethylphenol commonly known and hereinafter referred to as oxymetazoline.

These compounds are usually applied topically in the form of non-toxic, acid addition salts which are freely soluble in water. The hydrochlorides are especially preferred although the borate or tartrate may be employed if desired. Any type of pharmaceutically acceptable formulation is satisfactory but dilute aqueous solutions are most desirable containing from 0.1 percent to 1.5 percent by weight of active ingredient. Either xylometazoline or oxymetazoline in the percentages indicated can likewise be formulated with solid carriers such as petrolatum, wax, glyceryl monostearate or spermaceti to form ointments, creams or lotions by utilizing techniques well known to those skilled in the pharmaceutical compounding art. Both liquid and solid compositions are applied liberally to the affected eye from one to three times daily with frequency being reduced as a decrease in intraocular pressure is noted.

Both oxymetazoline and xylometazoline display a more rapid onset of action which persists for a longer period of time compared to anti-glaucoma agents employed in the past. Thus, the onset of action was twice as rapid as that of epinephrine and endured six times longer than when epinephrine was employed at the same concentration. In addition, dilute aqueous solutions of the compounds employed in the method of the present invention are stable for at least one week which eliminates the necessity of preparing a fresh solution each time such compositions are used.

PREFERRED EMBODIMENTS

The effectiveness of xylometazoline and oxymetazoline in reducing intraocular pressure was demonstrated by employing two different methods of evaluation as set forth more precisely in the following examples.

EXAMPLE 1

The methylcellulose induced elevated intraocular pressure method described in Arch. Ophthal., 78, 624 (1967) was used in which the anterior chamber of a rabbit eye was evacuated and the aqueous humor replaced with 0.5 percent methylcellulose solution in 0.9 percent saline. The resulting intraocular pressure increased steadily for 2 hours as measured by an applanometer. The elevation in intraocular pressure thus obtained was compared with the decrease in said pressure after topically applying to the rabbit eye various concentrations of oxymetazoline, xylometazoline and epinephrine dissolved in saline phosphate solution buffered to a pH of 7. Four rabbits were used for each dose in which the concentration ranged from 0.01 to 3.16 percent of each test compound. The compounds were topically applied every 30 minutes for 2 hours and the mean lowering of intraocular pressure was determined at each dose level. In this manner, an $ED_{50}$ was obtained which is defined as that dose which produced a 50 percent decrease in intraocular pressure. In addition, the relative potency compared to epinephrine as the standard was calculated with the following results:

| Compound | $ED_{50}(\%)$ | Relative Potency |
|---|---|---|
| Oxymetazoline | 0.14 | 2.8 |
| Xylometazoline | 0.68 | 0.6 |
| Epinephrine | 0.39 | 1.0 |

EXAMPLE 2

The same compounds employed in Example 1 were tested by the formalin method described in the Proceedings of the Society For Experimental Biology and Medicine, 131, 637 (1969). In this method, two drops or 0.1 ml. of a 2.5 percent aqueous solution of formalin were instilled into both eyes of a rabbit resulting in an immediate elevation of intraocular pressure which lasted for 30 minutes. Two minutes later, the test compounds in the same concentrations set forth in Example 1 were individually instilled in one eye of a rabbit with the other eye serving as a control. The intraocular pressure decrease was determined with an applanometer on 4 rabbits at each concentration and the $ED_{50}$ calculated over the total dose range with the following results:

| Compound | $ED_{50}(\%)$ | Relative Potency |
|---|---|---|
| Oxymetazoline | 0.045 | 1.9 |
| Xylometazoline | 0.059 | 1.4 |
| Epinephrine | 0.085 | 1.0 |

EXAMPLE 3

In other tests similar to those described in the foregoing examples, the onset and duration of intraocular pressure lowering activity of oxymetazoline and xylometazoline were compared to that obtained with epinephrine. The results were as follows:

| Compound | Onset of IOP Activity | Duration of IOP Activity |
|---|---|---|
| Oxymetazoline | 10–15 mins. | 12–16 hours |
| Xylometazoline | 10–20 mins. | 8–11 hours |
| Epinephrine | 20–30 mins. | 6–8 hours |

Although oxymetazoline and xylometazoline both provide increased efficacy in lowering intraocular pressure compared to epinephrine as the reference standard, these metazoline compounds were found to be devoid of serious side effects such as cardiovascular disorders so prevalent in agents employed for this purpose in the past. In addition, aqueous solutions of the metazoline compounds which effectively reduced the intraocular pressure by 50 percent were found to be stable for at least 1 week, whereas similar solutions of epinephrine were stable for only 1 day.

What is claimed is:

1. A method of lowering intraocular pressure which comprises topically applying to the eye an effective amount of a composition comprising a compound selected from the group consisting of 6-t-butyl-3-(2-imidazolin-2-ylmethyl)-2,4-dimethylphenol and 2-(4-t-butyl-2,6-dimethyl-benzyl)-2-imidazoline and a non-toxic, pharmaceutically acceptable, ophthalmological carrier therefor.

2. A method as in claim 1 in which the composition employed is an aqueous saline solution of 6-t-butyl-3-(2-imidazolin-2-ylmethyl)-2,4-dimethylphenol.

3. A method as in claim 1 in which the composition employed is an aqueous saline solution of 2-(4-t-butyl-2,6-dimethylbenzyl)-2-imidazoline.

4. A method as in claim 1 in which the compound employed is present in the composition in a concentration of from 0.1 to 1.5 percent by weight.

5. A method as in claim 1 in which the compound employed is in the form of an acid addition salt.

6. A method as in claim 5 in which the acid addition salt is a hydrochloride.

* * * * *